US012706493B2

(12) United States Patent
Aramaki

(10) Patent No.: US 12,706,493 B2
(45) Date of Patent: Aug. 11, 2026

(54) LAMINATED CORE, ROTOR, AND MANUFACTURING METHOD OF LAMINATED CORE

(71) Applicant: NIPPON STEEL CORPORATION, Tokyo (JP)

(72) Inventor: Takashi Aramaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 18/839,984

(22) PCT Filed: Mar. 7, 2023

(86) PCT No.: PCT/JP2023/008474

§ 371 (c)(1),
(2) Date: Aug. 20, 2024

(87) PCT Pub. No.: WO2023/171645

PCT Pub. Date: Sep. 14, 2023

(65) Prior Publication Data

US 2025/0112509 A1 Apr. 3, 2025

(30) Foreign Application Priority Data

Mar. 8, 2022 (JP) ................................ 2022-035322

(51) Int. Cl.
*H02K 1/06* (2006.01)
*H02K 1/276* (2022.01)
(Continued)

(52) U.S. Cl.
CPC ............... *H02K 1/276* (2013.01); *H02K 1/06* (2013.01); *H02K 15/0273* (2025.01); *H02K 15/035* (2025.01); *H02K 2213/03* (2013.01)

(58) Field of Classification Search
CPC .... H02K 1/276; H02K 15/02; H02K 15/0273; H02K 15/12; H02K 15/121; H02K 15/16;
(Continued)

(56) References Cited

U.S. PATENT DOCUMENTS

2014/0041207 A1 2/2014 Matsushita et al.
2014/0232230 A1* 8/2014 Yabe .................... H02K 1/2706 310/156.11
(Continued)

FOREIGN PATENT DOCUMENTS

CA 3 171 849 A1 12/2021
EP 3 902 111 A1 10/2021
(Continued)

*Primary Examiner* — Eric Johnson
(74) *Attorney, Agent, or Firm* — Birch, Stewart, Kolasch & Birch, LLP

(57) ABSTRACT

This laminated core is formed integrally by laminating a plurality of steel sheets including a first steel sheet and a second steel sheet. The first steel sheet is disposed as an outermost layer on one end side along the central axis and including a first exposed surface. The second steel sheet is disposed as an outermost layer on the other end side along the central axis and including a second exposed surface. In this laminated core, a difference between a maximum value and a minimum value in a distribution of a thickness that is a distance between the first exposed surface and the second exposed surface is 0.25 mm or less.

10 Claims, 5 Drawing Sheets

(51) Int. Cl.
*H02K 15/0273* (2025.01)
*H02K 15/035* (2025.01)

(58) Field of Classification Search
CPC .... H02K 15/165; H02K 2213/03; H02K 1/06; H02K 1/22; H02K 1/24; H02K 1/246; H02K 1/27; H02K 1/2706; H02K 1/272; H02K 1/274; H02K 1/2753
See application file for complete search history.

(56) References Cited

U.S. PATENT DOCUMENTS

| | | | | |
|---|---|---|---|---|
| 2018/0006509 | A1 | 1/2018 | Kato et al. | |
| 2018/0076700 | A1 | 3/2018 | Nagai et al. | |
| 2021/0143712 | A1 | 5/2021 | Nagasugi et al. | |
| 2021/0203196 | A1* | 7/2021 | Nigo | H02K 3/345 |
| 2022/0094218 | A1* | 3/2022 | Ohsugi | H02K 1/146 |
| 2022/0368182 | A1 | 11/2022 | Suenaga et al. | |

FOREIGN PATENT DOCUMENTS

| | | | | |
|---|---|---|---|---|
| JP | 54-129406 | A | 10/1979 | |
| JP | 2005-39963 | A | 2/2005 | |
| JP | 2007-124788 | A | 5/2007 | |
| JP | 2021-19374 | A | 2/2021 | |
| KR | 10-2013-0105937 | A | 9/2013 | |
| WO | WO-2020129935 | A1 * | 6/2020 | H02K 1/146 |
| WO | WO 2021/070795 | A1 | 4/2021 | |

* cited by examiner

FIG. 6

| CASE | TYPE OF MOTOR | JOINING STRUCTURE | KIND OF STEEL | SHEET THICKNESS mm | DIAMETER mm | CORE THICKNESS DEVIATION mm | AMPLITUDE AMOUNT AT 16000 rpm | EVALUATION |
|---|---|---|---|---|---|---|---|---|
| EXAMPLE 1 | IPM | EPOXY ADHESIVE RESIN | 25HX1300 | 0.25 | 166 | 0.04 | 150 μm OR LESS | Excellent |
| EXAMPLE 2 | IPM | CRIMPING PORTION | 30HX1800 | 0.30 | 133 | 0.20 | 150 μm OR LESS | Excellent |
| EXAMPLE 3 | INDUCTION | EPOXY ADHESIVE RESIN | 25HX1300 | 0.25 | 166 | 0.06 | 150 μm OR LESS | Excellent |
| EXAMPLE 4 | IPM | EPOXY ADHESIVE RESIN | 20HTH1200 | 0.20 | 160 | 0.25 | MORE THAN 150 μm AND 250 μm OR LESS | Good |
| EXAMPLE 5 | IPM | CRIMPING PORTION | 35H210 | 0.35 | 133 | 0.25 | MORE THAN 150 μm AND 250 μm OR LESS | Good |
| EXAMPLE 6 | INDUCTION | EPOXY ADHESIVE RESIN | 27HX1400 | 0.27 | 163 | 0.25 | MORE THAN 150 μm AND 250 μm OR LESS | Good |
| COMPARATIVE EXAMPLE A | IPM | EPOXY ADHESIVE RESIN | 25HX1300 | 0.25 | 163 | 0.28 | MORE THAN 250 μm | No Good |
| COMPARATIVE EXAMPLE B | IPM | CRIMPING PORTION | 30HX1800 | 0.30 | 163 | 0.28 | MORE THAN 250 μm | No Good |
| COMPARATIVE EXAMPLE C | INDUCTION | EPOXY ADHESIVE RESIN | 25HX1300 | 0.25 | 163 | 0.28 | MORE THAN 250 μm | No Good |
| EXAMPLE 7 | IPM | EPOXY ADHESIVE RESIN | 25HX1300 | 0.25 | 300 | 0.08 | 150 μm OR LESS | Excellent |
| EXAMPLE 8 | IPM | EPOXY ADHESIVE RESIN | 27HX1400 | 0.27 | 330 | 0.14 | MORE THAN 150 μm AND 250 μm OR LESS | Good |
| EXAMPLE 9 | IPM | EPOXY ADHESIVE RESIN | 25HX1300 COLD-ROLLED | 0.15 | 133 | 0.25 | MORE THAN 150 μm AND 250 μm OR LESS | Good |
| EXAMPLE 10 | IPM | EPOXY ADHESIVE RESIN | 25HX1300 COLD-ROLLED | 0.12 | 133 | 0.25 | MORE THAN 150 μm AND 250 μm OR LESS | Good |
| EXAMPLE 11 | IPM | EPOXY ADHESIVE RESIN | 25CS1250 | 0.25 | 133 | 0.09 | 150 μm OR LESS | Excellent |
| EXAMPLE 12 | IPM | ACRYLIC ADHESIVE RESIN | 25HX1300 | 0.25 | 133 | 0.06 | 150 μm OR LESS | Excellent |

LAMINATED CORE, ROTOR, AND MANUFACTURING METHOD OF LAMINATED CORE

TECHNICAL FIELD OF THE INVENTION

The present invention relates to a laminated core, a rotor, and a manufacturing method of a laminated core.

The present application claims priority based on Japanese Patent Application No. 2022-035322 filed in Japan on Mar. 8, 2022, the contents of which are incorporated herein by reference.

RELATED ART

In the related art, there has been a rotor used as a rotary body in a rotary electric machine (electric motor). The rotor uses, for example, a laminated core manufactured by integrally laminating a plurality of electrical steel sheets by crimping using plastic deformation. Alternatively, the rotor uses a laminated core manufactured by integrally laminating a plurality of electrical steel sheets by bonding.

From the demand of increasing the speed of electric vehicles, an increase in the output of a rotary electric machine has been aimed. Since the output is proportional to the rotation speed, an increase in rotation speed has been demanded.

CITATION LIST

Patent Document

[Patent Document 1]
Japanese Unexamined Patent Application, First Publication No. 2005-39963
[Patent Document 2]
PCT International Publication No. WO 2021/070795

SUMMARY OF INVENTION

Problems to be Solved by the Invention

With the advent of hybrid vehicles and electric vehicles, an increase in the speed of rotary electric machines have developing, and deformation of the rotor has become noticeable. Therefore, a technique for reducing the deformation is required.

For example, Patent Document 1 discloses a technique in which strength of a steel sheet laminated to be a laminated core used for a rotor is increased to reduce deformation by keeping the steel sheet in an elastic region when the rotor is operated in a high rotation speed region. Patent Document 2 proposes that an adhesive is used in manufacturing a laminated core instead of crimping and deformation is reduced by increasing the strength of the adhesive.

However, since the laminated core has a laminated structure formed by laminating a plurality of steel sheets, dimensional variations of the steel sheets are also accumulated, and accordingly the dimensional variation of the laminated core tends to be large. Thus, reduction in deformation of the rotor by increasing the strength of the steel sheets has limitations. Although the rotation speed can be increased by these techniques for increasing the strength of the core, it cannot be said that such an approach is sufficient in the recent situation in which an increase in rotation speed is developing.

In view of the problems of the above related art, an object of the present invention is to provide a laminated core, a rotor, and a manufacturing method of the laminated core, all of which are applicable to a rotary electric machine having a high rotation speed.

Means for Solving the Problem

The gist of the present invention is as follows.

(1) A laminated core according to an aspect of the present invention is a laminated core being integrally formed by laminating a plurality of steel sheets including a first steel sheet and a second steel sheet, the first steel sheet being disposed as an outermost layer on one end side along a central axis and including a first exposed surface, the second steel sheet being disposed as an outermost layer on the other end side along the central axis and including a second exposed surface, in which a difference between a maximum value and a minimum value in a distribution of a thickness that is a distance between the first exposed surface and the second exposed surface is 0.25 mm or less.

(2) In the above (1), each of the plurality of steel sheets may be a non-oriented electrical steel sheet having a yield point of 320 MPa or more.

(3) In the above (1) or (2), the laminated core may have a structure in which a steel sheet among the plurality of steel sheets and an adhesive resin are alternately laminated, and each of the plurality of steel sheets may have a diameter of 80 mm or more and a sheet thickness of 0.35 mm or less.

(4) In the above (3), the adhesive resin may be an acrylic resin or an epoxy resin.

(5) In any one of the above (1) to (4), the laminated core may further include a slot, and the thickness may include a measurement value at a first measurement position between the slots adjacent to each other in a circumferential direction.

(6) In any one of the above (1) to (5), the laminated core may include a slot, and the thickness may include a measurement value at a second measurement position between the central axis and the slot.

(7) In any one of the above (1) to (6), the laminated core may include a slot, and the thickness may include a measurement value at a third measurement position between the slots adjacent to each other in a radial direction perpendicular to the central axis.

(8) In any one of the above (1) to (7), the laminated core may include a slot, and the thickness may include a measurement value at a fourth measurement position between an outer circumferential edge and the slot.

(9) In any one of the above (1) to (8), the steel sheets adjacent to each other among the plurality of steel sheets may be joined to each other via a crimping portion formed in each of the steel sheets adjacent to each other, and the thickness may include a measurement value at a fifth measurement position between the crimping portions adjacent to each other in a circumferential direction.

(10) A rotor according to an aspect of the present invention may include the laminated core according to any one of above (1) to (9), and an amplitude amount in a radial direction perpendicular to the central axis when the rotor is rotated at 16000 rpm may be 250 μm or less.

(11) A manufacturing method of a laminated core according to an aspect of the present invention is a manufacturing method of a laminated core being integrally formed by laminating a plurality of steel sheets including a first steel sheet and a second steel sheet, the first steel sheet being disposed as an outermost layer on one end side along a central axis and including a first exposed surface, the second steel sheet being disposed as an outermost layer on the other end side along the central axis and including a second exposed surface, the manufacturing method including: a resin coating step of coating the plurality of steel sheets with an adhesive resin; a laminating step of forming a laminated body by laminating the plurality of steel sheets; and a pressurizing and heating step of pressurizing and heating the laminated body, in which the pressurizing and heating step includes controlling a rise temperature, and a difference between a maximum value and a minimum value in a distribution of a thickness that is a distance between the first exposed surface and the second exposed surface is 0.25 mm or less at the rise temperature being controlled.

Effects of the Invention

According to the present invention, it is possible to provide a laminated core, a rotor, and a manufacturing method of the laminated core, all of which are applicable to a rotary electric machine having a high rotation speed.

BRIEF DESCRIPTION OF THE DRAWINGS

FIG. 6 is a table indicating results of a test for test bodies.

EMBODIMENTS OF THE INVENTION

The inventor has found that a rotor using a laminated core in a state of a poor shape balance due to dimensional variations (in a strained state as compared with a complete rotary body) has a large amplitude particularly due to a runout in a radial direction perpendicular to a central axis in a high rotation speed region and excessive deformation occurs.

The inventor has also found the knowledge that, by improving the shape balance of the laminated core (making a well-proportioned laminated core), runout (amplitude amount) in the radial direction perpendicular to the central axis of the rotor can be reduced, and deformation can be reduced in the high rotation speed region.

Furthermore, the inventor has found the knowledge that it is appropriate to express the shape balance of the laminated core that affects the runout of the rotor in the high rotation speed region by using the core thickness deviation, and further found the upper limit of the core thickness deviation.

The laminated core is integrally formed by laminating a plurality of steel sheets including: a first steel sheet disposed as an outermost layer on one end side along the central axis and including a first exposed surface; and a second steel sheet disposed as an outermost layer on the other end side along the central axis and including a second exposed surface. The laminated core includes a slot. The core thickness deviation is preferably 0.25 mm or less, where the core thickness deviation is represented by the difference between the maximum value and the minimum value in the distribution of a thickness that is the distance between the first exposed surface and the second exposed surface.

As a result, in the high rotation speed region, runout (amplitude amount) in the radial direction perpendicular to the central axis of the rotor can be reduced, and the deformation can be reduced. Therefore, it is possible to provide a laminated core, a rotor, and a manufacturing method of the laminated core, all of which are applicable to a rotary electric machine having a high rotation speed.

Hereinafter, embodiments of the present invention will be described.

First Embodiment

A laminated core 10 according to a first embodiment will be described.

Figure 1:
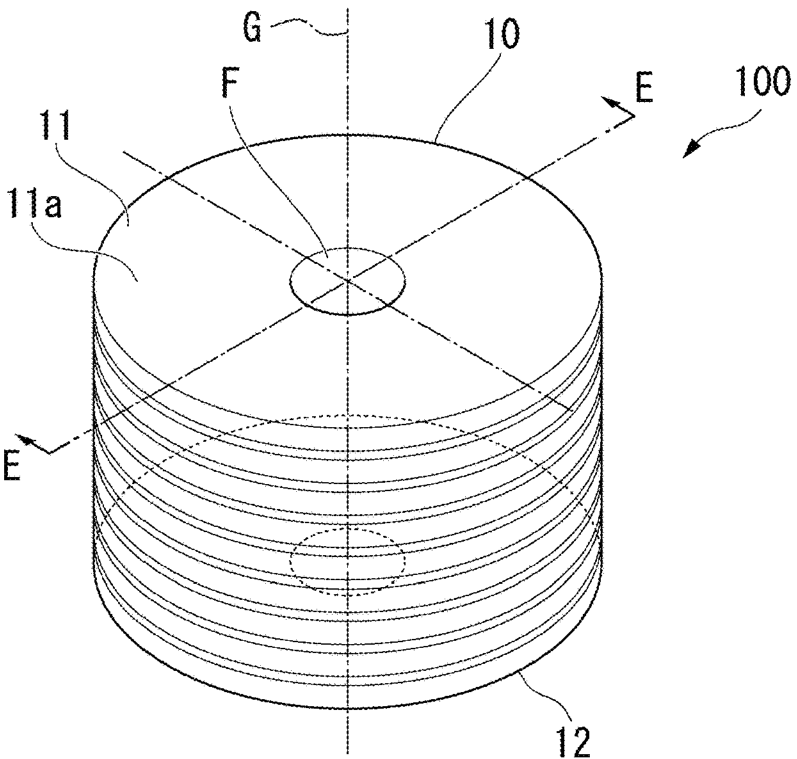
FIG. 1 is a schematic perspective view of a rotor.
Figure 2:
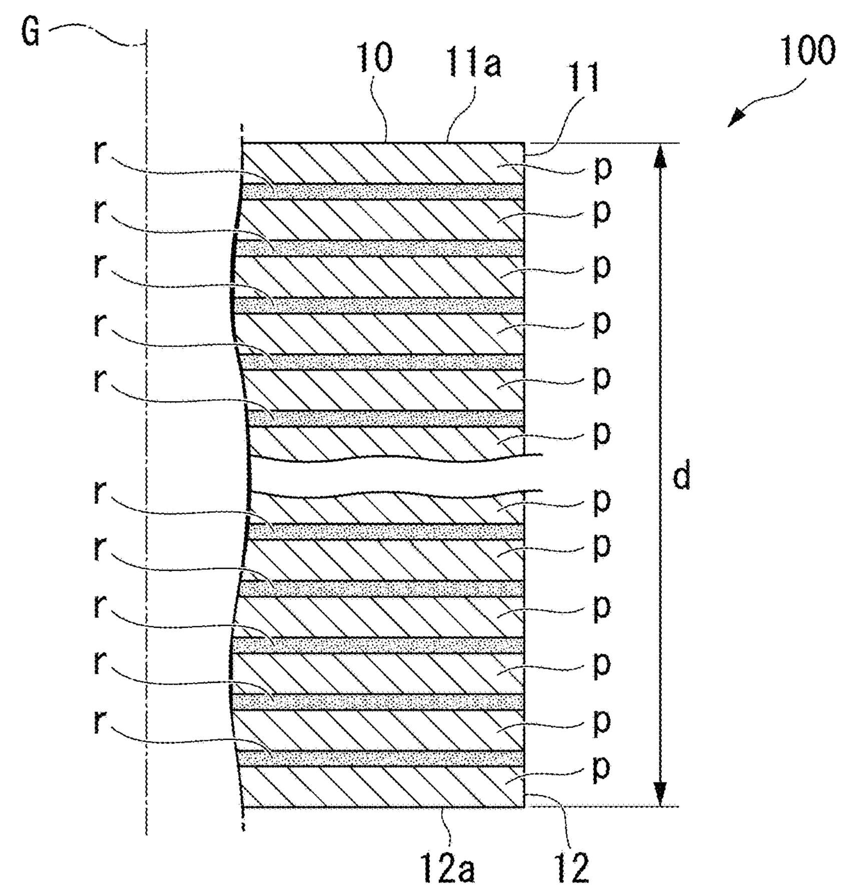
FIG. 2 is a schematic cross-sectional view of FIG. 1 taken along a line E as viewed perpendicularly to a central axis G.
Figure 3:
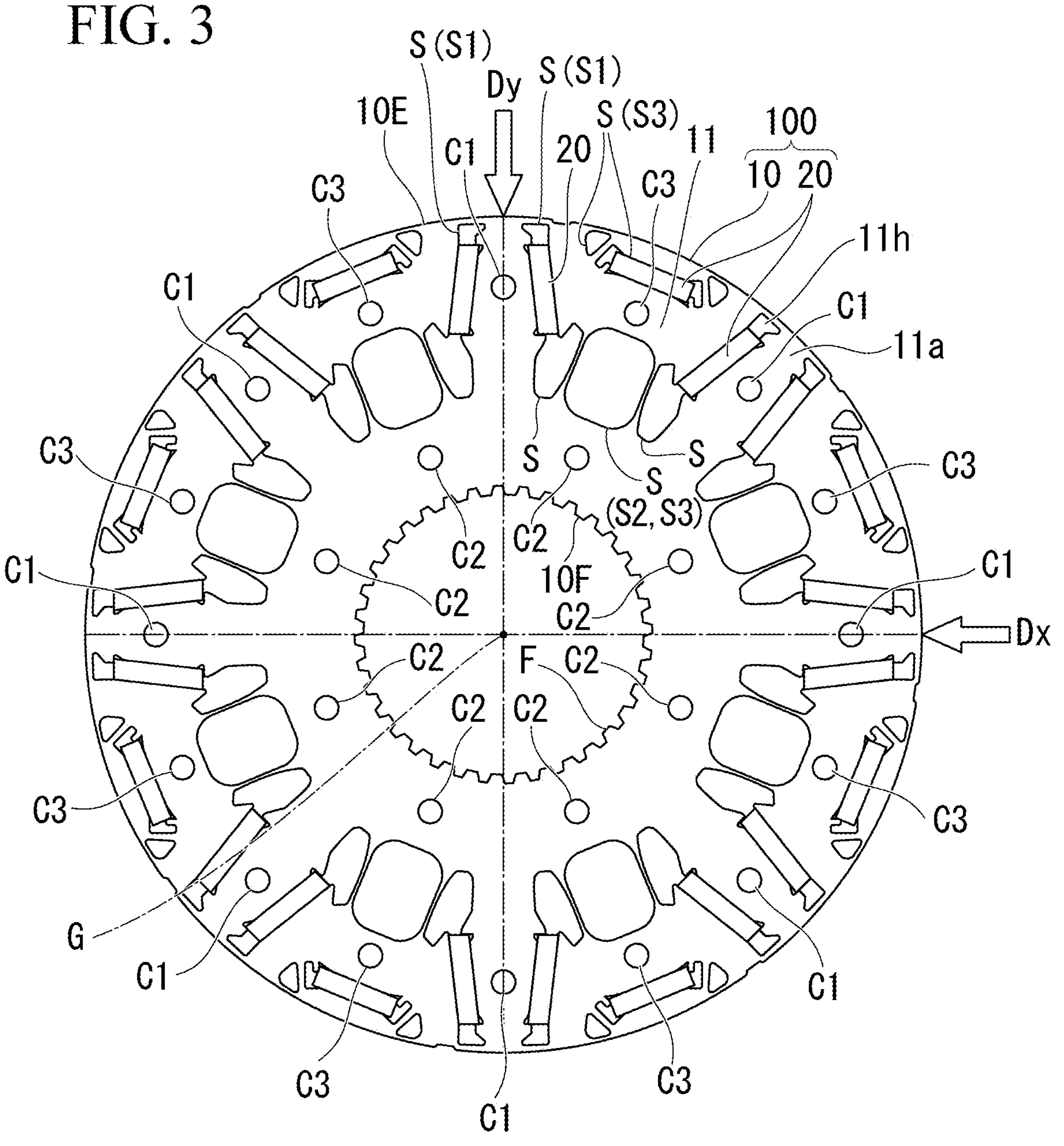
FIG. 3 is a plan view of a rotor according to a first embodiment.

FIG. 1 is a schematic perspective view of a rotor 100. FIG. 2 is a schematic cross-sectional view of FIG. 1 taken along a line E as viewed perpendicularly to a central axis G. FIG. 3 is a plan view of the rotor 100 according to the first embodiment. Note that FIG. 3 is a view as viewed along the central axis G.

As illustrated in FIG. 3, the laminated core 10 according to the first embodiment is used for the rotor 100. The rotor 100 includes the laminated core 10 and permanent magnets 20. The rotor 100 is used for a rotary electric machine (electric motor). The rotary electric machine includes the rotor 100 and a stator (not illustrated) disposed so as to surround an outer circumference of the rotor 100. The rotary electric machine may be an interior permanent magnet (IPM) motor or an induction motor. The rotor 100 is disposed inside the stator.

The laminated core 10 includes an opening part F for fitting an output shaft (not illustrated) in a portion including the central axis G and fixing the output shaft. The laminated core 10 has a columnar shape including the opening part F at the center.

The laminated core 10 has poles, the number of which corresponds to the number of poles of the stator. The laminated core 10 includes the permanent magnets 20 arranged around the central axis G at equal angles in accordance with the number of poles. The laminated core 10 has an n-fold rotationally symmetric shape around the central axis G, where n represents the number corresponding to the number of poles.

As illustrated in FIGS. 1 and 2, the laminated core 10 is integrally formed by laminating a plurality of steel sheets p in a direction along the central axis G. The plurality of steel sheets p includes: a first steel sheet 11 disposed as an outermost layer on one end side along the central axis G and including a first exposed surface 11*a*; and a second steel sheet 12 disposed as an outermost layer on the other end side (opposite to the first steel sheet 11) along the central axis G and including a second exposed surface 12*a*.

As illustrated in FIG. 3, the laminated core 10 includes slots S. Note that the slot S includes a slit for fitting the permanent magnet 20 thereinto and a cavity for controlling magnetic flux distribution, magnetic characteristics, and the like. The core thickness deviation is 0.25 mm or less, where the core thickness deviation is represented by the difference between the maximum value and the minimum value in the distribution of a thickness d that is the distance between the first exposed surface 11*a* and the second exposed surface 12*a*. Note that the thickness d is a distance between the first exposed surface 11*a* and the second exposed surface 12*a* in a direction along the central axis G. The measurement values of the thickness d necessary for obtaining the core thickness deviation may be any measurement values that are obtained at two or more positions, preferably obtained at three or more positions, more preferably obtained at positions, the number of which is equal to or more than the number of poles of the rotary electric machine. The upper limit of the core thickness deviation is preferably 0.10 mm. The lower limit of the core thickness deviation is industrially about 0.02 mm. In this manner, the core thickness deviation of the laminated core 10 was set to 0.25 mm or less. In this way, the shape balance of the laminated core 10 can be improved, and it is possible to prevent a change in the locus formed when the laminated core 10 rotates about the central axis G. Thus, in the high rotation speed region, runout (amplitude amount) in the radial direction perpendicular to the central axis of the rotor 100 can be reduced, and the deformation can be reduced. Therefore, the laminated core 10 is applicable to a rotary electric machine having a high rotation speed.

The laminated core 10 has a structure in which the plurality of steel sheets p are laminated in a direction along the central axis G. The plurality of steel sheets p constituting the laminated core 10 may have the same shape. That is, each of the plurality of steel sheets p constituting the laminated core 10 may include the slots S having the same shape and the same arrangement, and may have the crimping portions K having the same shape and the same arrangement (see FIG. 4), if needed.

In the steel sheet p constituting the laminated core 10, the steel sheet p having a smaller sheet thickness t can provide the more improved magnetic characteristics and the more enhanced performance of the rotary electric machine. On the other hand, the increased number of the steel sheets p to be laminated leads to an increase in the accumulation of manufacturing errors per single steel sheet and an increase in the core thickness deviation of the laminated core 10. Therefore, the upper limit of the sheet thickness t of the steel sheet p is 0.35 mm, preferably 0.20 mm. The lower limit of the sheet thickness t of the steel sheet p is 0.15 mm.

As illustrated in FIG. 2, the laminated core 10 may have a structure in which the steel sheet p and an adhesive resin r are alternately laminated. The steel sheet p preferably has a diameter of 80 mm or more and a sheet thickness (sheet thickness t) of 0.35 mm or less. With this configuration, the laminated core 10 having the core thickness deviation as small as possible can be formed, and the deformation of the rotor 100 in the high rotation range can be reduced.

The steel sheet p is preferably a non-oriented electrical steel sheet having a yield point of 320 MPa or more. In this way, deformation of the rotor 100 in the high rotation range can be reduced, iron losses can be reduced, and performance of the rotor 100 can be enhanced.

The adhesive resin r may be an acrylic resin or an epoxy resin. In this way, the laminated core 10 can be integrated while reducing the expansion and contraction of the adhesive resin r as much as possible throughout the manufacturing method of the laminated core 10 including the step of bonding the adjacent steel sheets p.

The amplitude amount of the rotor 100 in the radial direction perpendicular to the central axis G when the rotor 100 is rotated at 16000 rpm (rotations per minute) is 250 μm or less. Here, the amplitude amount means the maximum displacement in the radial direction perpendicular to the central axis G in an outer circumferential edge 10E of the laminated core 10 when the rotor 100 is rotated. The amplitude amount may be measured by, for example, a laser displacement meter. The amplitude amount may be displacement measured at a position and in a direction indicated by arrows Dx and Dy in FIGS. 3 and 4. The number of measurement positions of the amplitude amount are preferably two or more, and the measurement positions are preferably orthogonal to each other. As described above, by keeping the core thickness deviation of the laminated core 10 low, the amplitude amount of the rotor 100 can be reduced. Therefore, the amplitude amount of the rotor 100 can be reduced even in a high rotation speed region in which centrifugal force that might cause contact with the stator is generated.

(Measurement Position)

Next, a position at which the thickness d of the laminated core 10 necessary for obtaining the core thickness deviation is measured will be described. Note that the thickness d of the laminated core 10 may be a measurement value obtained by measuring the length of the laminated core 10 along the central axis G at the measurement position with a ruler such as a caliper, a laser displacement meter, or the like. As a measurement value of the thickness d at a predetermined measurement position in the laminated core 10, an arithmetical mean of measurement values obtained by measuring the thickness d at the predetermined measurement position three times or more may be used. When the distribution of the thickness d is obtained, the thickness d is preferably measured at four or more measurement positions at equal angles around the central axis G.

The number of measurement positions is preferably increased in accordance with the number of the slots S included in the laminated core 10.

As illustrated in FIG. 3, the thickness d of the laminated core 10, that is, the distance between the first exposed surface 11*a* and the second exposed surface 12*a* (the surface opposite to the first exposed surface 11*a*) may include a measurement value at a first measurement position C1 between two of the slots S (hereinafter, also referred to as a slot S1) adjacent to each other in the circumferential direction. Each of the slots S1 extends in the radial direction and is disposed at an interval in the circumferential direction.

The first measurement position C1 is not limited as long as the first measurement position C1 is positioned between the two slots S1. The first measurement position C1 may be any position as long as the first measurement position C1 is in a region surrounded by the two slots S1, a line connecting the ends on the outer side of the two slots S1 in the radial direction, and a line connecting the ends on the inner side of the two slots S1 in the radial direction. The first measurement position C1 is preferably an intersection point of a line connecting the end on the inner side of one slot S1 in the radial direction among the two slots S1 and the outer end of the other slot S1 in the radial direction and a line connecting the outer end of the one slot S1 in the radial direction and the end on the inner side of the other slot S1 in the radial direction. Since the laminated core 10 at this intersection point is easily twisted when an external force acts on the laminated core 10, the intersection point is preferable as the first measurement position C1.

Note that a plurality of the first measurement positions C1 may be provided at equal intervals on the same circumference. As described above, in the manufacturing process of the laminated core 10 including the slot forming step by press-punching the slot S in the steel sheet p, the pressurizing and heating step before and after laminating the plurality of steel sheets p, the thickness d at the first measurement position C1, which is a portion relatively easily deformed, is measured. Then, the core thickness deviation is obtained from the measurement value of the thickness d at the first measurement position C1. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

As illustrated in FIG. 3, the thickness d of the laminated core 10 may include a measurement value at a second measurement position C2 between the central axis G and the slot S (hereinafter, also referred to as a slot S2). The second measurement position C2 is not limited as long as the second measurement position C2 is positioned between the central axis G and the slot S2. The second measurement position C2 may be any position as long as the second measurement position C2 is in a region surrounded by the slot S2, a line connecting the end portion on the front side of the rotor 100 in the rotation direction among the end portions in the circumferential direction of the slot S2 and the central axis G, and a line connecting the end portion on the rear side of the rotor 100 in the rotation direction and the central axis G. On a line connecting the central axis G and the center of the slot S2, the second measurement position C2 is preferably a center of a line connecting an intersection point of that line and an inner circumferential edge 10F of the laminated core 10 and an intersection point of that line and the slot S2 on the inner side in the radial direction.

Note that a plurality of the second measurement positions C2 may be provided at equal intervals on the same circumference. As described above, similarly to the first measurement position C1, the thickness d at the second measurement position C2, which is a portion relatively easily deformed, is measured. Then, the core thickness deviation is obtained from the measurement value of the thickness d at the second measurement position C2. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

As illustrated in FIG. 3, the thickness d of the laminated core 10 may include a measurement value at a third measurement position C3 between the two slots S adjacent to each other in the radial direction perpendicular to the central axis G (hereinafter, such slots are also referred to as slots S3). The third measurement position C3 is not limited as long as the third measurement position C3 is positioned between the two slots S3. The third measurement position C3 may be any position as long as the third measurement position C3 is in a region surrounded by the two slots S3, a line connecting the end portions on the front side of the rotor 100 in the rotation direction among the end portions of the two slot S3 in the circumferential direction, and a line connecting the end portions on the rear side of the rotor 100 in the rotation direction.

The third measurement position C3 is preferably a midpoint of a line connecting the centers of the two slots S3 in the circumferential direction.

Note that a plurality of the third measurement positions C3 may be provided at equal intervals on the same circumference. As described above, similarly to the first measurement position C1 and the second measurement position C2, the thickness d at the third measurement position C3, which is a portion relatively easily deformed, is measured. Then, the core thickness deviation is obtained from the measurement value of the thickness d at the third measurement position C3. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

The straightness (perpendicularity) of the laminated core 10 is preferably 0.4 or less, and most preferably 0.2 or less. The straightness referred to herein is defined by "JIS B 0621-1984 Definitions and Designations of Geometrical Deviations", which is a Japanese Industrial Standard. The straightness means the degree of deviation of a linear-shaped body from a geometrically correct straight line.

Second Embodiment

Next, a laminated core 10 according to a second embodiment will be described. In the second embodiment, description of portions common to the first embodiment may be omitted. In the second embodiment, the same reference symbols as those assigned to the functional units of the first embodiment are assigned to the functional units common to the first embodiment.

Figure 4:
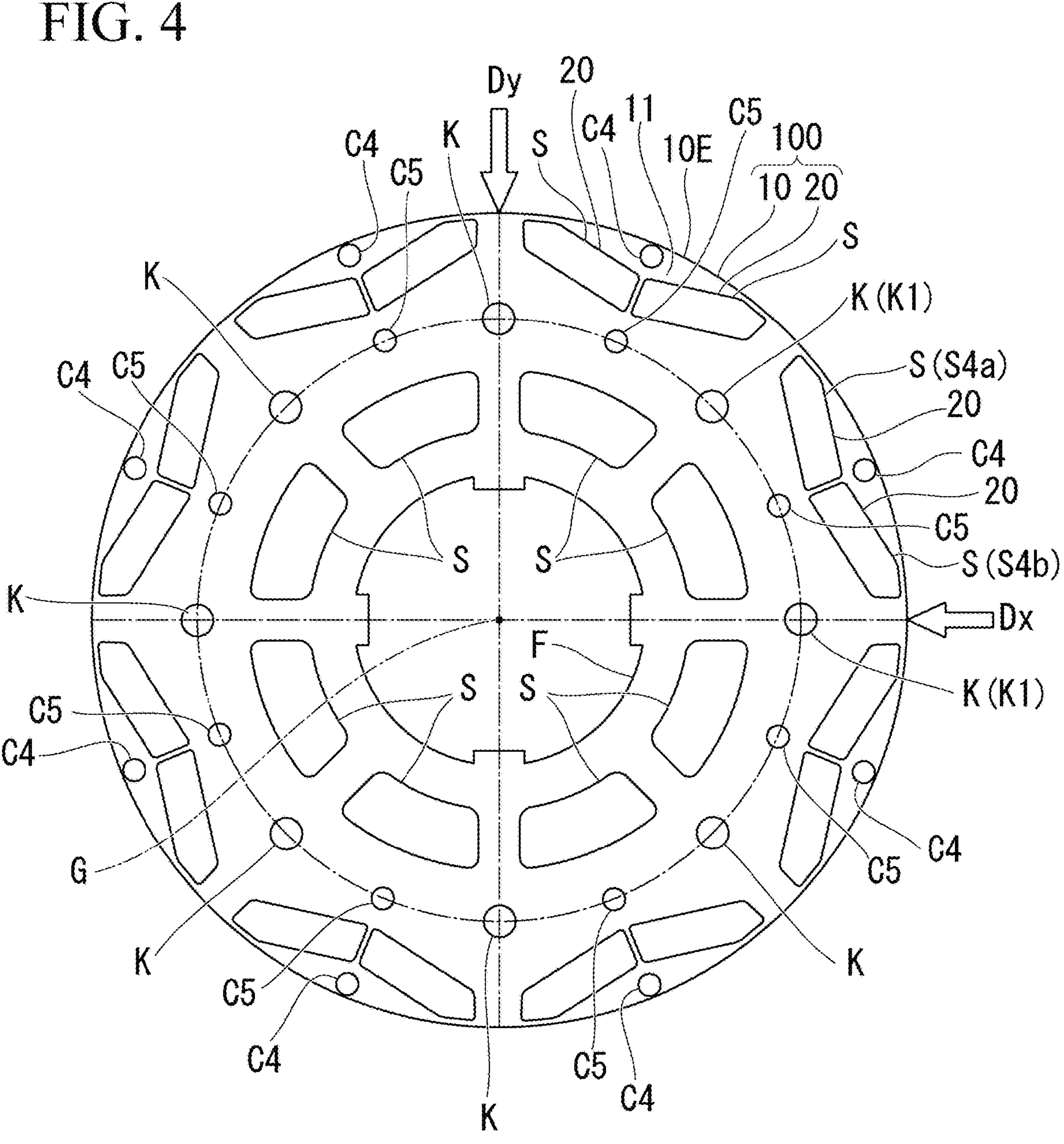
FIG. 4 is a plan view of a rotor according to a second embodiment.

FIG. 4 is a plan view of a rotor 100 according to the second embodiment. Note that FIG. 4 is a view as viewed along a central axis G.

Similarly to that in the first embodiment, the laminated core 10 according to the second embodiment is used for the rotor 100. The laminated core 10 according to the second embodiment is different from that of the first embodiment mainly in arrangement of permanent magnets 20 and in joining of adjacent steel sheets p via crimping portions K.

As illustrated in FIG. 4, two adjacent steel sheets p constituting the laminated core 10 are joined to each other via the crimping portions K formed in each of the steel sheets p. The crimping portion K is a portion of opposing positions of the adjacent steel sheets p that are crimped and joined to each other by plastic deformation. As described above, even when the laminated core 10 integrated by the crimping portion K is adopted, the well-proportioned laminated core 10 in which the core thickness deviation is kept low can be obtained.

(Measurement Position)

Next, a position at which a thickness d of the laminated core 10 necessary for obtaining the core thickness deviation is measured will be described.

As illustrated in FIG. 4, the thickness d of the laminated core 10, that is, the distance between a first exposed surface 11*a* and a second exposed surface 12*a* (the surface opposite to the first exposed surface 11*a*) may include a measurement value at a fourth measurement position C4 between an outer circumferential edge 10E of the laminated core 10 and slots S (hereinafter, also referred to as slots S4*a* and S4*b*).

The slot S4*a* gradually extends toward a first side (one side) in the circumferential direction as approaching the outer side in the radial direction. With respect to the slot S4*a*, the slot S4*b* is disposed adjacent to a second side (the other side) opposite to the first side in the circumferential direction. The slot S4*b* extends gradually toward the second side in the circumferential direction as approaching the outer side in the radial direction.

The fourth measurement position C4 is not limited as long as the fourth measurement position C4 is positioned between the outer circumferential edge 10E and the slot S4*a* and between the outer circumferential edge 10E and the slot S4*b*. The fourth measurement position C4 is preferably the center between: the center between the end portion of the slot S4*a* on the slot S4*b* side and the end portion of the slot S4*b* on the slot S4*a* side; and the portion of the outer circumferential edge 10E positioned on the outer side in the radial direction with respect to this center.

Note that a plurality of the fourth measurement positions C4 may be provided at equal intervals on the same circumference. As described above, similarly to the first measurement position C1 to the third measurement position C3, the thickness d at the fourth measurement position C4, which is a portion relatively easily deformed, is measured. Then, the core thickness deviation is obtained from the measurement value of the thickness d at the fourth measurement position C4. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

As illustrated in FIG. 4, the thickness d of the laminated core 10 may include a measurement value at a fifth measurement position C5 between the two crimping portions K adjacent to each other in the circumferential direction (hereinafter, also referred to as crimping portions K1). The fifth measurement position C5 is not limited as long as the fifth measurement position C5 is positioned between the two crimping portions K1 in the circumferential direction. The fifth measurement position C5 is preferably a midpoint between the two crimping portions K1 in the circumferential direction.

Note that a plurality of the fifth measurement position C5 may be provided at equal intervals on the same circumference. As described above, similarly to the first measurement position C1 to the fourth measurement position C4, the thickness d at the fifth measurement position C5, which is a portion relatively easily deformed, is measured. Then, the core thickness deviation is obtained from the measurement value of the thickness d at the fifth measurement position C5. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

Note that the thickness d of the laminated core 10 may be measured at a plurality of measurement positions obtained by appropriately combining the first measurement position C1 to the fifth measurement position C5 described above.

Third Embodiment

Next, a laminated core 10 according to a third embodiment will be described. In the third embodiment, description of portions common to the first embodiment or the second embodiment may be omitted. In the third embodiment, the same reference symbols as those assigned to the functional units of the first embodiment or the second embodiment are assigned to the functional units common to the first embodiment or the second embodiment.

Figure 5:
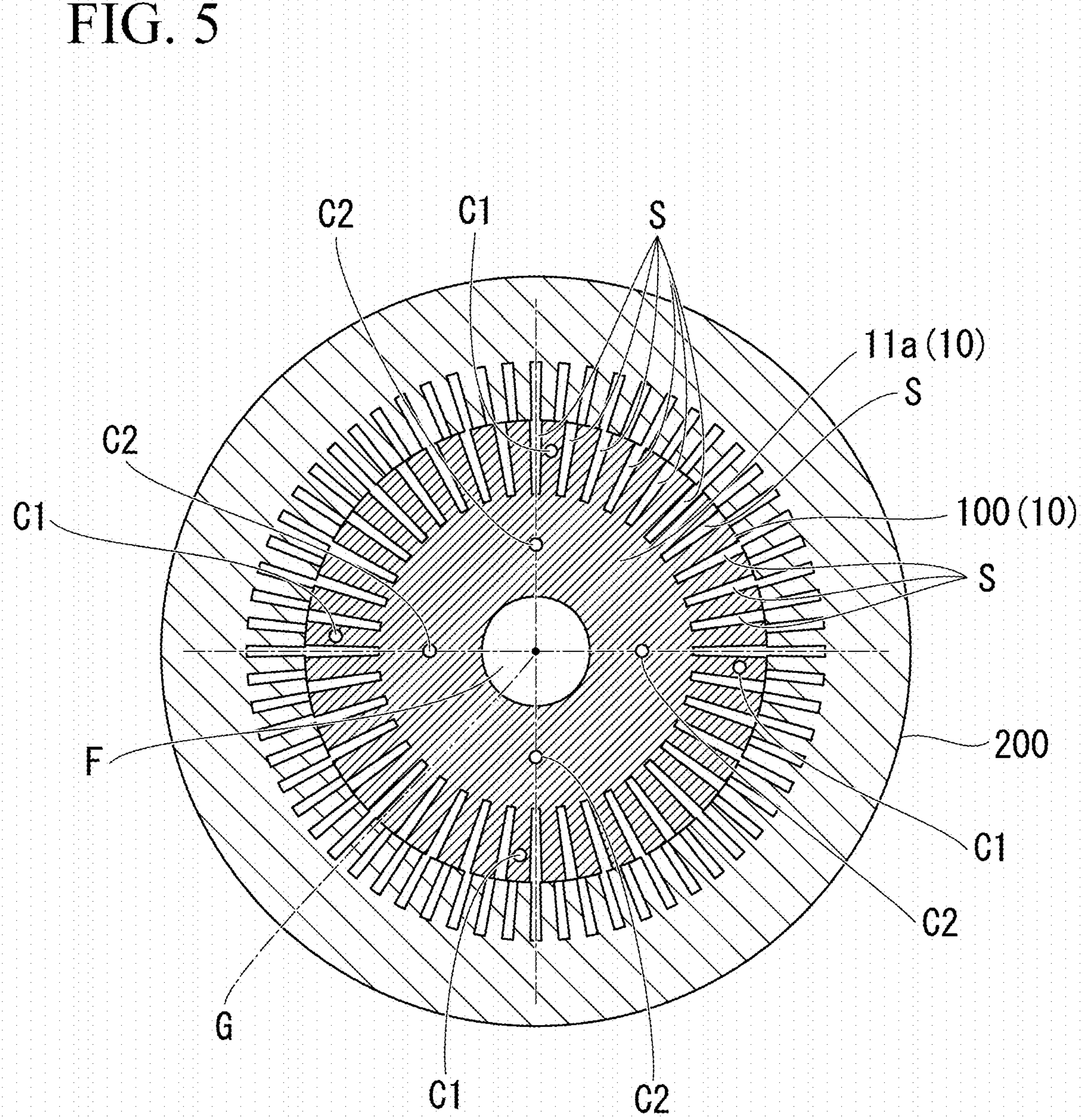
FIG. 5 is a plan view of a rotor according to a third embodiment.

FIG. 5 is a plan view of a rotor 100 according to the third embodiment. Note that FIG. 5 is a view as viewed along a central axis G.

The laminated core 10 according to the third embodiment is used for the rotor 100 of the induction motor. As illustrated in FIG. 5, the rotor 100 is accommodated in the inside of a hollow cylindrical stator 200 including a stator core wound by a coil.

The rotor 100 includes a slot S extending along the central axis G and cut out from an outer circumferential edge 10E toward the central axis G. The slot S has a wedge-shaped cross section perpendicular to the central axis G. A plurality of the slots S are arranged at equal intervals in the circumferential direction around the central axis G. A conductor made of a conductive non-magnetic material such as aluminum or copper is fitted into the slot S.

(Measurement Position)

Next, a position at which a thickness d of the laminated core 10 necessary for obtaining the core thickness deviation is measured will be described.

As illustrated in FIG. 5, the thickness d of the laminated core 10, that is, the distance between a first exposed surface 11*a* and a second exposed surface 12*a* (the surface opposite to the first exposed surface 11*a*) may include a measurement value at a first measurement position C1 between two of the slots S adjacent to each other in the circumferential direction. Note that a plurality (e.g., four in the arrangement illustrated in FIG. 5) of the first measurement position C1 may be provided at equal intervals on the same circumference. As described above, in the manufacturing process of the laminated core 10, the thickness d at the first measurement position C1, which is a portion relatively easily deformed, is measured. Then, the core thickness deviation is obtained from the measurement value of the thickness d at the first measurement position C1. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

As illustrated in FIG. 5, the thickness d of the laminated core 10 may include a measurement value at a second measurement position C2 between the central axis G and the slot S. Note that a plurality (e.g., four in the arrangement illustrated in FIG. 5) of the second measurement position C2 may be provided at equal intervals on the same circumference. As described above, similarly to the first measurement position C1, the thickness d at the second measurement position C2, which is a portion relatively easily deformed, is measured. Then, the core thickness deviation is obtained from the measurement value of the thickness d at the second measurement position C2. In this way, the well-proportioned laminated core 10 in which the core thickness deviation is kept low can be obtained. Thus, in the high rotation speed region, runout (amplitude amount) in the radial direction perpendicular to the central axis of the rotor can be reduced, and the deformation can be reduced.

(Manufacturing Method)

Next, a manufacturing method of a laminated core 10 will be described.

The laminated core 10 is integrally formed by laminating a plurality of steel sheets in a direction along a central axis G. The plurality of steel sheets includes: a first steel sheet 11 disposed as an outermost layer on one end side along the central axis G and including a first exposed surface 11*a*; and a second steel sheet 12 disposed as an outermost layer on the other end side along the central axis G and including a second exposed surface 12*a*.

Adjacent steel sheets p may be joined with an adhesive resin r interposed therebetween, may be joined via a crimping portion K, or may be joined with the adhesive resin r interposed therebetween and via the crimping portion K.

Specifically, the adhesive resin r is coated to the steel sheet p (resin coating step).

A slot S is formed in the steel sheet p (slot forming step).

A laminated body is formed by laminating a plurality of the steel sheets p (laminating step).

Then, the laminated body obtained in the laminating step is pressurized and heated (pressurizing and heating step). This step encourages the joining strength between the adjacent steel sheets p. In this pressurizing and heating step, rise temperature is controlled so that the core thickness deviation is 0.25 mm or less, where the core thickness deviation is represented by the difference between the maximum value and the minimum value in the distribution of a thickness d that is the distance between the first exposed surface 11*a* and the second exposed surface 12*a*.

After the pressurizing and heating step, the laminated body is cooled (cooling step).

When the cooling step is completed, all steps of the manufacturing method of the laminated core 10 are completed, and the laminated core 10 is manufactured.

For example, in the pressurizing and heating step, the temperature is raised from the state of the normal temperature (20 degrees) to 220 degrees at a rate of 10 degrees/second or less so that the core thickness deviation is 0.25 mm or less depending on the material of the adhesive resin r, the size and arrangement of the slots S, the presence or absence of the crimping portion K, and the like.

When the laminated core 10 includes the plurality of steel sheets p and the plurality of adhesive resins r, the surface area of the plurality of steel sheets p is larger than the surface area of the plurality of adhesive resins r. Therefore, the core thickness deviation is dominated by the temperature deviation of the plurality of steel sheets p rather than the temperature deviation of the plurality of adhesive resins r. As a result, even when the steel sheets p include the slot S and the adjacent steel sheets p are laminated by being joined to each other by the adhesive resin r or the crimping portion K, the core thickness deviation of the laminated core 10 can be kept low.

In the pressurizing and heating step, when the laminated body is pressurized in the die, the laminated body can be pressurized from the side (in the radial direction), so that the applied pressure can be kept at, for example, about 0.5 MPa (megapascal). On the other hand, when the laminated body is pressurized at the outside of the die, the laminated body cannot be pressurized from the side. Thus, for example, the applied pressure needs to be set to about 1.0 MPa.

In the cooling step, the laminated body is preferably cooled by, for example, air cooling or the like at a speed of 10 degrees/second or less.

(Test)

Next, a test for measuring the amplitude amount (runout) of the rotor 100 including the laminated core 10 when the rotor 100 is rotated at 16000 rpm in a high rotation speed region was performed. FIG. 6 is a table indicating test results.

The test was performed on several test bodies of the rotor 100 (Embodiments 1 to 12 and Comparative Examples 1 to 3) in which the combination of the following conditions was changed: the type of motor; the joining structure of the laminated core 10 (whether joining by interposing the adhesive resin r or joining via the crimping portion K); the kind of the steel sheet p (combination of tensile strength, yield point, elongation and hardness Hv); the core thickness deviation of the laminated core 10 (rotor 100); the kind of the adhesive resin r; the diameter of the steel sheet p; and the sheet thickness t of the steel sheet p.

The kinds of steel of the steel sheet p constituting the laminated core 10 used for the test body are as listed in Table 1. An electrical steel sheet was used as the steel sheet p. Note that, in Table 1, "YP" indicates the yield point strength in MPa. "W15/50" indicates the upper limit of loss per unit weight at a frequency of 50 Hz at an amplitude of magnetic flux density of 1.5 T (tesla) or more in W/kg. "W10/400" indicates the upper limit of loss per unit weight at a frequency of 400 Hz at an amplitude of the magnetic flux density of 10 T or more in W/kg.

TABLE 1

| Kind of steel | YP | W15/50 | W10/400 |
|---|---|---|---|
| 25HX1300 | 394 | 2.02 | 12.4 |
| 27HX1500 | 385 | 2.06 | 13.7 |
| 30HX1800 | 371 | — | 14.7 |
| 20HTH1200 | 419 | — | 10.8 |
| 35H210 | 391 | 2.01 | — |
| 25HX1400 | 394 | — | 13.3 |
| 25CS1250HF | 410 | 2.01 | 12.2 |

The thickness d of the rotor serving as a test body was set to 150 mm+0.5%.

When the laminated core used for the rotor serving as the test body had a joining structure by interposing the adhesive resin r, a plurality of steel sheet elements were formed by press-punching the steel sheet p coated with the adhesive resin r, and a laminated body obtained by laminating the plurality of steel sheet elements was pressurized and heated to manufacture the laminated core. The core thickness deviation is affected by the temperature rising rate (When the temperature rising rate is too low, the adhesive resin r does not uniformly fall, and the levelness decreases. When the temperature rising rate is too high, the steel sheet p is deformed, and the levelness is lowered). For this reason, test bodies were prepared by adjusting the temperature rising rate for obtaining the target levelness.

When the laminated core used for the rotor serving as the test body had a joining structure via the crimping portion K, a plurality of steel sheet elements were formed, the plurality of steel sheet elements were laminated, and the adjacent steel sheet elements were crimped to each other to be integrally formed, so that the laminated core was manufactured. Thereafter, the core thickness deviation was measured. The extremely small deformation of the steel sheet p is reflected in the core thickness deviation. For this reason, test bodies were prepared by finely adjusting the shape dimension, the pressurizing amount, and the like of the pressing die for obtaining the target levelness.

The thicknesses d of the laminated core 10 for obtaining the levelness were measured with a caliper at all measurement positions including the first measurement positions C1 (8 positions), the second measurement positions C2 (8 positions), and the third measurement positions C3 (8 positions) illustrated in FIG. 3. The levelness was obtained as an absolute value of a difference between a minimum value and a maximum value of the measurement values thereof (distribution of the thickness d).

As illustrated in FIG. 3, distance variations in the directions of the arrows Dx and Dy were measured with a laser displacement meter while the rotor was rotated at 16000 rpm or more, and the maximum value thereof was taken as the amplitude amount. When the amplitude amount was 150 μm or less, it was evaluated as Excellent. When the amplitude amount was more than 150 μm and 250 μm or less, it was evaluated as Good. When the amplitude amount was more than 250 μm, it was evaluated as No Good. Test bodies evaluated as Excellent or Good were regarded as acceptable.

The test bodies and test results are as follows.

(1) A test body of the rotor according to Example 1 was for an IPM motor. The test body of the rotor according to Example 1 used a laminated core having a joining structure in which a plurality of steel sheets (25HX1300) having a sheet thickness (sheet thickness t) of 0.25 mm and a diameter of 166 mm were joined with epoxy adhesive resins respectively interposed therebetween. The test body of the rotor according to Example 1 had a core thickness deviation of 0.04 mm.

As a result of the test, the amplitude amount when the test body of Example 1 was rotated at 16000 rpm was 150 μm or less.

(2) A test body of the rotor according to Example 2 was for an IPM motor. The test body of the rotor according to Example 2 used a laminated core having a joining structure in which a plurality of steel sheets (30HX1800) having a sheet thickness (sheet thickness t) of 0.30 mm and a diameter of 133 mm were joined via crimping portions K. The test body of the rotor according to Example 2 had a core thickness deviation of 0.20 mm.

As a result of the test, the amplitude amount when the test body of Example 2 was rotated at 16000 rpm was 150 μm or less.

(3) A test body of the rotor according to Example 3 was for an induction motor.

The test body of the rotor according to Example 3 used a laminated core having a joining structure in which a plurality of steel sheets (25HX1300) having a sheet thickness (sheet thickness t) of 0.25 mm and a diameter of 166 mm were joined with epoxy adhesive resins respectively interposed therebetween. The test body of the rotor according to Example 3 had a core thickness deviation of 0.06 mm.

As a result of the test, the amplitude amount when the test body of Example 3 was rotated at 16000 rpm was 150 μm or less.

(4) A test body of the rotor according to Example 4 was for an IPM motor. The test body of the rotor according to Example 4 used a laminated core having a joining structure in which a plurality of steel sheets (20HTH1200) having a sheet thickness (sheet thickness t) of 0.20 mm and a diameter of 160 mm were joined with epoxy adhesive resins respectively interposed therebetween. The test body of the rotor according to Example 4 had a core thickness deviation of 0.25 mm.

As a result of the test, the amplitude amount when the test body of Example 4 was rotated at 16000 rpm was more than 150 μm and 250 μm or less.

(5) A test body of the rotor according to Example 5 was for an IPM motor. The test body of the rotor according to Example 5 used a laminated core having a joining structure in which a plurality of steel sheets (35H210) having a sheet thickness (sheet thickness t) of 0.35 mm and a diameter of 133 mm were joined via crimping portions K.

The test body of the rotor according to Example 5 had a core thickness deviation of 0.25 mm.

As a result of the test, the amplitude amount when the test body of Example 5 was rotated at 16000 rpm was more than 150 μm and 250 μm or less.

(6) A test body of the rotor according to Example 6 was for an induction motor. The test body of the rotor according to Example 6 used a laminated core having a joining structure in which a plurality of steel sheets (27HX1500) having a sheet thickness (sheet thickness t) of 0.27 mm and a diameter of 163 mm were joined with epoxy adhesive resins respectively interposed therebetween. The test body of the rotor according to Example 6 had a core thickness deviation of 0.25 mm.

As a result of the test, the amplitude amount when the test body of Example 6 was rotated at 16000 rpm was more than 150 μm and 250 μm or less.

(7) A test body of the rotor according to Example 7 was for an IPM motor. The test body of the rotor according to Example 7 used a laminated core having a joining structure in which a plurality of steel sheets (25HX1300) having a sheet thickness (sheet thickness t) of 0.25 mm and a diameter of 300 mm were joined with epoxy adhesive resins respectively interposed therebetween. The test body of the rotor according to Example 7 had a core thickness deviation of 0.08 mm.

As a result of the test, the amplitude amount when the test body of Example 7 was rotated at 16000 rpm was 150 μm or less.

(8) A test body of the rotor according to Example 8 was for an IPM motor. The test body of the rotor according to Example 8 used a laminated core having a joining structure in which a plurality of steel sheets (27HX1500) having a sheet thickness (sheet thickness t) of 0.27 mm and a diameter of 330 mm were joined with epoxy adhesive resins respectively interposed therebetween. The test body of the rotor according to Example 8 had a core thickness deviation of 0.14 mm.

As a result of the test, the amplitude amount when the test body of Example 8 was rotated at 16000 rpm was more than 150 μm and 250 μm or less.

(9) A test body of the rotor according to Example 9 was for an IPM motor. The test body of the rotor according to Example 9 used a laminated core having a joining structure in which a plurality of cold-rolled steel sheets (25HX1300) having a sheet thickness (sheet thickness t) of 0.15 mm and a diameter of 133 mm were joined with epoxy adhesive resins respectively interposed therebetween. The test body of the rotor according to Example 9 had a core thickness deviation of 0.25 mm.

As a result of the test, the amplitude amount when the test body of Example 9 was rotated at 16000 rpm was more than 150 μm and 250 μm or less.

(10) A test body of the rotor according to Example 10 was for an IPM motor. The test body of the rotor according to Example 10 used a laminated core having a joining structure in which a plurality of cold-rolled steel sheets (25HX1300) having a sheet thickness (sheet thickness t) of 0.12 mm and a diameter of 133 mm were joined with epoxy adhesive resins respectively interposed therebetween. The test body of the rotor according to Example 10 had a core thickness deviation of 0.25 mm.

As a result of the test, the amplitude amount when the test body of Example 10 was rotated at 16000 rpm was more than 150 μm and 250 μm or less.

(11) A test body of the rotor according to Example 11 was for an IPM motor. The test body of the rotor according to Example 11 used a laminated core having a joining structure in which a plurality of steel sheets (25CS1250) having a sheet thickness (sheet thickness t) of 0.25 mm and a diameter of 133 mm were joined with epoxy adhesive resins respectively interposed therebetween. The test body of the rotor according to Example 11 had a core thickness deviation of 0.09 mm.

As a result of the test, the amplitude amount when the test body of Example 11 was rotated at 16000 rpm was 150 μm or less.

(12) A test body of the rotor according to Example 12 was for an IPM motor. The test body of the rotor according to Example 12 used a laminated core having a joining structure in which a plurality of steel sheets (25HX1300) having a sheet thickness (sheet thickness t) of 0.25 mm and a diameter of 133 mm were joined with acrylic adhesive resins respectively interposed therebetween. The test body of the rotor according to Example 12 had a core thickness deviation of 0.06 mm.

As a result of the test, the amplitude amount when the test body of Example 12 was rotated at 16000 rpm was 150 μm or less.

(A) A test body of the rotor according to Comparative Example A was for an IPM motor. The test body of the rotor according to Comparative Example A used a laminated core having a joining structure in which a plurality of steel sheets (25HX1300) having a sheet thickness (sheet thickness t) of 0.25 mm and a diameter of 163 mm were joined with epoxy adhesive resins respectively interposed therebetween. The test body of the rotor according to Comparative Example A had a core thickness deviation of 0.28 mm.

As a result of the test, the amplitude amount when the test body of Comparative Example A was rotated at 16000 rpm was more than 250 μm.

(B) A test body of the rotor according to Comparative Example B was for an IPM motor. The test body of the rotor according to Comparative Example B used a laminated core having a joining structure in which a plurality of steel sheets (30HX1800) having a sheet thickness (sheet thickness t) of 0.30 mm and a diameter of 163 mm were joined via crimping portions K. The test body of the rotor according to Comparative Example B had a core thickness deviation of 0.28 mm.

As a result of the test, the amplitude amount when the test body of Comparative Example B was rotated at 16000 rpm was more than 250 μm.

(C) A test body of the rotor according to Comparative Example C was for an induction motor. The test body of the rotor according to Comparative Example C used a laminated core having a joining structure in which a plurality of steel sheets (25HX1300) having a sheet thickness (sheet thickness t) of 0.25 mm and a diameter of 163 mm were joined with epoxy adhesive resins respectively interposed therebetween. The test body of the rotor according to Comparative Example C had a core thickness deviation of 0.28 mm.

As a result of the test, the amplitude amount when the test body of Comparative Example C was rotated at 16000 rpm was more than 250 μm.

Results of the test are indicated in FIG. 6. In the cases of Examples 1 to 12 in which the core thickness deviations were 0.25 mm or less, the amplitude amounts at 16000 rpm fell within 250 μm or less, which were good results. In particular, in the cases of Examples 1 to 3, 7, 11, and 12, the amplitude amounts at 16000 rpm fell within 150 μm or less, which were excellent results. In contrast to these results, in the cases of Comparative Example A, Comparative Example B, and Comparative Example C in which the core thickness deviations exceeded 0.25 mm, the amplitude amounts at 16000 rpm were more than 250 μm, which were relatively large amplitude amounts and no good results.

Other Embodiments

Although the embodiments have been described in detail with reference to the drawings, the specific constitution is not limited to those described above, and various design changes and the like can be made.

The laminated core 10 according to the present embodiment is integrally formed by laminating the plurality of steel sheets p. The plurality of steel sheets p includes: the first steel sheet 11 disposed as an outermost layer on one end side along the central axis G and including the first exposed surface 11*a*; and the second steel sheet 12 disposed as an outermost layer on the other end side along the central axis G and including the second exposed surface 12*a*. The core thickness deviation is 0.25 mm or less, where the core thickness deviation is represented by the difference between the maximum value and the minimum value in the distribution of the thickness d that is the distance between the first exposed surface 11*a* and the second exposed surface 12*a*. The laminated core 10 made to be well proportioned in this manner can keep the amplitude amount (runout) of the rotor low even in the high rotation speed region. Accordingly, the laminated core 10 hardly deformed in the high rotation speed region can be made without relying on impartment of high strength to the steel sheets to be laminated used for the laminated core 10. Therefore, it is possible to provide the laminated core 10, the rotor 100, and the manufacturing method of the laminated core 10, all of which are applicable to a rotary electric machine having a high rotation speed.

The amplitude amount of the rotor 100 according to the present embodiment in the radial direction perpendicular to the central axis G when the rotor 100 is rotated at 16000 rpm is 250 μm or less. Therefore, the amplitude amount of the rotor 100 can be reduced even in a high rotation speed region in which centrifugal force that might cause contact with the stator is generated.

The laminated core 10 may not include the slot S. In this case, the manufacturing method of the laminated core 10 may not include the slot forming step.

The manufacturing method of the laminated core 10 according to the present embodiment is integrally formed by laminating the plurality of steel sheets p. The plurality of steel sheets p includes: the first steel sheet 11 disposed as an outermost layer on one end side along the central axis G and including the first exposed surface 11*a*; and the second steel sheet 12 disposed as an outermost layer on the other end side along the central axis G and including the second exposed surface 12*a*. The manufacturing method includes: a resin coating step of coating the steel sheet p with the adhesive resin r; a laminating step of forming a laminated body by laminating the plurality of steel sheets p; and a pressurizing and heating step of pressurizing and heating the laminated body. In the pressurizing and heating step, rise temperature is controlled so that the difference between the maximum value and the minimum value in the distribution of the thickness d that is the distance between the first exposed surface 11*a* and the second exposed surface 12*a*, is 0.25 mm or less. As a result, even when the adjacent steel sheets p are laminated by being joined to each other by the adhesive resin r or the crimping portion K, the core thickness deviation of the laminated core 10 can be kept low.

Field of Industrial Application

The laminated core, the rotor, and the manufacturing method of the laminated core are applicable to a rotary electric machine having a high rotation speed. Therefore, the present invention has significant industrial applicability.

BRIEF DESCRIPTION OF THE REFERENCE SYMBOLS

10 Laminated core
10E Outer circumferential edge
11 First steel sheet
11*a* First exposed surface
12 Second steel sheet
12*a* Second exposed surface
20 Permanent magnet
100 Rotor
200 Stator
C1 First measurement position C2 Second measurement position
C3 Third measurement position
C4 Fourth measurement position
C5 Fifth measurement position
Dx Arrow
Dy Arrow
F Opening part
G Central axis
K Crimping portion
S Slot
p Steel sheet
r Adhesive resin
d Thickness of laminated core
t Sheet thickness of steel sheet

The invention claimed is:

1. A laminated core being integrally formed by laminating a plurality of steel sheets including a first steel sheet and a second steel sheet, the first steel sheet being disposed as an outermost layer on one end side along a central axis and including a first exposed surface, the second steel sheet being disposed as an outermost layer on the other end side along the central axis and including a second exposed surface, wherein a difference between a maximum value and a minimum value in a distribution of a thickness, calculated at a plurality of positions, on a same circumference at an easily deformable portion of the laminated core, that is a distance between the first exposed surface and the second exposed surface is 0.25 mm or less.

2. The laminated core according to claim 1, wherein each of the plurality of steel sheets is a non-oriented electrical steel sheet having a yield point of 320 MPa or more.

3. The laminated core according to claim 1, wherein the laminated core has a structure in which a steel sheet among the plurality of steel sheets and an adhesive resin are alternately laminated, and each of the plurality of steel sheets has a diameter of 80 mm or more and a sheet thickness of 0.35 mm or less.

4. The laminated core according to claim 3, wherein the adhesive resin is an acrylic resin or an epoxy resin.

5. The laminated core according to claim 1, further comprising a slot, wherein the thickness includes a measurement value at a first measurement position between the slots adjacent to each other in a circumferential direction.

6. The laminated core according to claim 1, further comprising a slot, wherein the thickness includes a measurement value at a second measurement position between the central axis and the slot.

7. The laminated core according to claim 1, further comprising a slot, wherein the thickness includes a measurement value at a third measurement position between the slots adjacent to each other in a radial direction perpendicular to the central axis.

8. The laminated core according to claim 1, further comprising a slot, wherein the thickness includes a measurement value at a fourth measurement position between an outer circumferential edge and the slot.

9. The laminated core according to claim 1, wherein the steel sheets adjacent to each other among the plurality of steel sheets are joined to each other via a crimping portion formed in each of the steel sheets adjacent to each other, and the thickness includes a measurement value at a fifth measurement position between the crimping portions adjacent to each other in a circumferential direction.

10. A rotor comprising the laminated core according to claim 1, wherein an amplitude amount in a radial direction perpendicular to the central axis when the rotor is rotated at 16000 rpm is 250 μm or less.

* * * * *